United States Patent [19]

Yoshimoto

[11] Patent Number: 4,865,217
[45] Date of Patent: Sep. 12, 1989

[54] EASILY OPENABLE SEALED CONTAINER

[75] Inventor: Mamoru Yoshimoto, Nishinomiya, Japan

[73] Assignee: Sumitomo Bakelite Company, Limited, Tokyo, Japan

[21] Appl. No.: 236,840

[22] Filed: Aug. 26, 1988

[30] Foreign Application Priority Data

Aug. 31, 1987 [JP] Japan ............................ 62-131508[U]
Dec. 17, 1987 [JP] Japan ............................ 62-190748[U]

[51] Int. Cl.$^4$ ............................................. B65D 41/00
[52] U.S. Cl. ................... 220/359; 229/123.1; 229/123.2; 229/125.35
[58] Field of Search .............. 220/359; 229/123.1, 229/123.2, 125.35

[56] References Cited

U.S. PATENT DOCUMENTS

| | | | |
|---|---|---|---|
| 3,655,503 | 4/1972 | Stanley et al. | |
| 3,997,677 | 12/1976 | Hirsch et al. | 229/125.35 |
| 4,381,848 | 5/1983 | Kahn | 229/123.2 |
| 4,801,041 | 1/1989 | Takata et al. | 220/359 |

FOREIGN PATENT DOCUMENTS 0241002 10/1987 European Pat. Off. .
53-59596 5/1978 Japan .
53-100339 8/1978 Japan .
62-251363 11/1987 Japan .

Primary Examiner—Carroll B. Dority, Jr.
Attorney, Agent, or Firm—Browdy and Neimark

[57] ABSTRACT

An easily openable sealed container comprising a lid and a main body having at least a sealing layer and an adjacent layer beneath the sealing layer, wherein the main body and the lid are sealed at a part of the flange, characterized in that the sealing layer of the main body at the flange has a thickness of 10–70 $\mu$, the lamination strength between the sealing layer and the adjacent layer of the main body at the flange is 300–2,000 g/25 mm, and the sealing strength between the lid and sealing layer of the main body at the flange is larger than the lamination strength between the sealing layer and the adjacent layer of the main body at the flange, and further characterized in that the main body and the lid are sealed with a larger sealing pressure at least at the innermost portion of the sealed area of the flange than at the rest of the sealed area, or that the flange of the main body has double grooves and the main body and the lid are sealed between these grooves.

20 Claims, 3 Drawing Sheets

EASILY OPENABLE SEALED CONTAINER present invention relates to an easily openable sealed container comprising a main body and a lid wherein the main body and the lid are sealed at a part of the flange.

In the most common conventional method for easy opening of sealed plastic containers, the sealing layer of the lid was made of a mixture of various resins to control the sealing strength between the main body and the lid appropriately, for example, at 600–1,000 g/15 mm and thereby to enable the peeling of the lid from its interface with the main body.

The above sealing strength between the main body and the lid was liable to be affected by various factors such as sealing conditions, environmental temperature and adhesion of contents to the sealed portion and was difficult to keep it at a constant level. When the sealing strength was too small, there was sometimes caused the leakage of contents due to poor sealing. When the sealing strength was too large, the pealability of the sealed container was poor, making its opening difficult. Since the leakage of contents is detrimental, the sealing strength was generally set at a higher level by employing, for example, a higher sealing temperature or pressure. Therefore, the opening of sealed containers was relatively difficult.

In order to overcome the above difficulty in opening, there is known, for example, a method for opening a sealed container by peeling the sealing layer from the layer adjacent thereto (e.g., Japanese Patent Publication No. 37598/1975). However, the peeling of the sealing layer did not work well when the container was sealed in an ordinary manner, making it difficult to take out the contents.

Thus, the conventional sealed plastic containers produced by heat sealing have had a difficulty in satisfying both of the two contradictory requirements, i.e., no leakage and easy opening. Hence, the object of the present invention is to produce a sealed container which is free from leakage and reliably has easy openability irrespective of the sealing conditions. As a result of study, the present inventors have found that the above object can be achieved by properly setting the thickness of the sealing layer of the main body at the flange and the lamination strength between the sealing layer and the adjacent layer of the main body at the flange and further by, in heat-sealing the main body and the lid at the flange, applying properly altered sealing pressures to different portions of the area of the flange to be sealed or by forming double grooves in the area of the flange of the main body to be sealed with the lid. Further study based on the above finding has led to the completion of the present invention.

The present invention resides in an easily openable sealed container comprising a lid and a main body having at least a sealing layer and an adjacent layer beneath the sealing layer, wherein the main body and the lid are sealed at a part of the flange, characterized in that the sealing layer of the main body at the flange has a thickness of 10–70μ, the lamination strength between the sealing layer and the adjacent layer of the main body at the flange is 300–2,000 g/25 mm, and the sealing strength between the lid and the sealing layer of the main body at the flange is larger than the lamination strength between the sealing layer and the adjacent layer of the main body at the flange, and further characterized in that the main body and the lid are sealed with a larger sealing pressure at least at the innermost portion of the sealed area of the flange than at the rest of the sealed area, or that the flange of the main body has double grooves and the main body and the lid are sealed between these grooves.

One preferred embodiment of the present invention is a sealed container having a sealing strength different partly in the sealed area, as mentioned above, wherein the innermost portion of the sealed area has a groove formed by pressing and is dented as compared with the rest of the sealed area. Another preferred embodiment of the present invention is a sealed container having a sealing strength different partly in the sealed area, as mentioned above, wherein the innermost and outermost portions of the sealed area have a groove formed by pressing and are dented as compared with the rest of the sealed area.

The main body of the sealed container of the present invention is made of a multi-layer sheet or film comprising at least a sealing layer and an adjacent layer beneath the sealing layer, wherein the sealing layer has a thickness of 10–70μ and the lamination strength between the sealing layer and the adjacent layer is 300–2,000 g/25 mm as measured at 180° peeling and a peeling rate of 200 mm/min. This multi-layer sheet may be, for example, a two-layer sheet constituted by a sealing layer of a polyethylene resin and an adjacent layer of a polypropylene resin, or a six-layer sheet constituted by a sealing layer of a polyethylene, an adjacent layer of a polypropylene, an adhesive layer, a barrier layer of a saponification product of an ethylene-vinyl acetate copolymer or of a polyvinylidene chloride resin, an adhesive layer and an outermost layer of a polypropylene. Also, the multi-layer sheet may be any sheet comprising at least the above two layers of any thermoplastic resin as long as the above requirements are satisfied. Furthermore, the present main body may be made of a composite sheet of such a multilayer sheet with a paper or a metal foil such as aluminum.

When the lamination strength between the sealing layer and the adjacent layer is below 300 g/25 mm, the resulting sealed container has no sufficient sealing property. When the lamination strength is above 2,000 g/25 mm, a very large peeling strength is required and the resulting sealed container has no easy openability When the sealing layer has a thickness smaller than 10μ, the innermost portion of the sealed area of the sealing layer is broken by a small internal pressure, which may cause leakage. When the sealing layer has a thickness larger than 70μ, the innermost portion of the sealed area of the sealing layer is not cut at the time of opening and the sealing layer continues to be peeled beyond that innermost portion, thus making it difficult to open the container.

The lid of the sealed container of the present invention is made of a film. The film may be a single layer film constituted only by a sealing layer, or a multi-layer film further comprising an outer layer of aluminum foil, polypropylene or the like of good barrier property. Preferably, the sealing layer of the lid is made of a material which can easily adhere to the sealing layer of the main body with a sufficiently large sealing strength. More preferably, the sealing layer of the lid is made of the same material as that of the sealing layer of the main body.

The structure, opening mechanism and sealing method of the sealed container of the present invention are explained in detail referring to the accompanying drawings.

Figure 1:
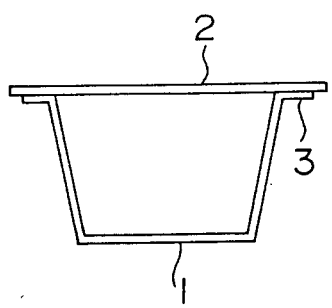
FIG. 1 is a schematic sectional view showing an embodiment of the sealed container of the present invention.

FIG. 1 is a schematic sectional view showing one embodiment of the sealed container of the present invention. A sealed container of the present invention is obtained by heat-sealing a main body 1 and a lid 2. 3 is a flange.

Figure 2:
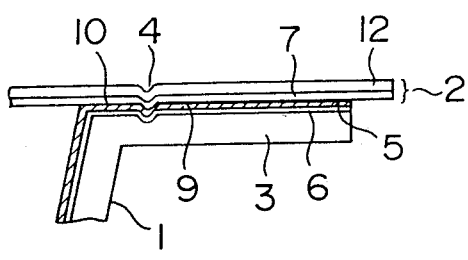
FIG. 2 is an enlarged sectional view showing a part of the flange of FIG. 1.

FIG. 2 is an enlarged sectional view of the flange 3 of FIG. 1. 4 is a groove formed by pressing (the groove is hereinafter referred to as "dented portion"). The dented portion 4 is the most dented portion of the sealed area of the flange. This embodiment is characterized in that the dented portion 4 is positioned at the innermost portion of the sealed area. Accordingly, the portion of the sealing layer outside the dented portion 4 is sealed, but the portion of the sealing layer inside the dented portion 4 is not sealed.

Therefore, the sealing layer of the flange consists of a sealed area 9 and a non-sealed area 10 separated by the dented portion 4.

5 shows a sealing layer of the main body (hereinafter referred to as sealing layer A 5), and 6 shows an adjacent layer beneath the sealing layer A 5.

Figure 3:
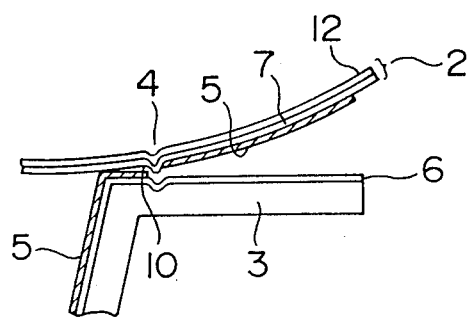
FIG. 3 is a sectional view showing a state where the sealed container of FIG. 2 is being opened.

FIG. 3 shows a state where the sealed container of FIG. 2 is being opened. When the lid 2 is pulled upward at the lobe 12, the sealing layer A 5 remains adhered to the sealing layer 7 of the lid and peeling occurs between the sealing layer A 5 and the adjacent layer 6, because the sealing strength between the sealing layer A 5 and the sealing layer 7 is larger than the lamination strength between the sealing layer A 5 and the adjacent layer 6. This peeling occurs as far as the dented portion 4. At the dented portion 4, the sealing layer A 5 is cut by the pulling force, and therefore beyond the dented portion 4, only the lid is peeled upward and opening is effected.

Figure 4:
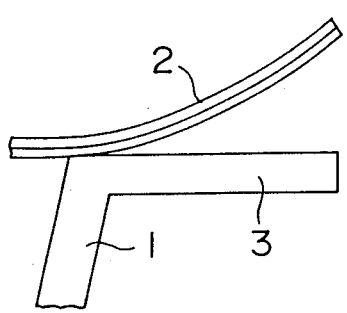
FIG. 4 is a sectional view showing a state where an easily openable container of the conventional type is being opened.

FIG. 4 shows a state where a conventional sealed container of easy opening is being opened. In opening, peeling occurs at the heat-sealed interface between the main body and the lid.

Figure 5:
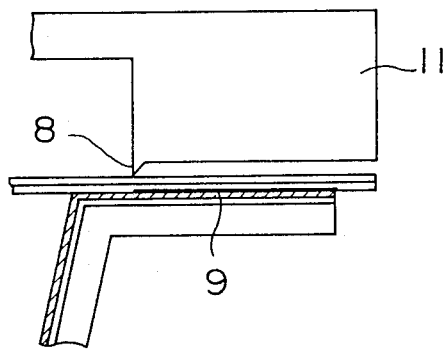
FIGS. 5 to 7 are each a sectional view showing (a) the shape of a sealing plate used in the sealing of the container of the present invention and (b) a sealing method using the sealing plate.
Figure 6:
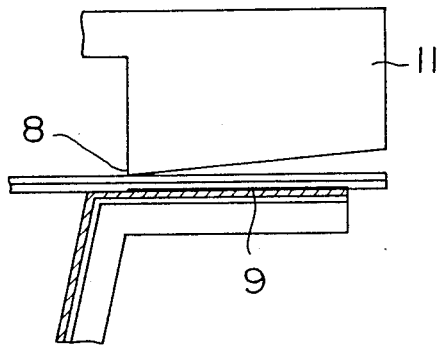
Figure 7:
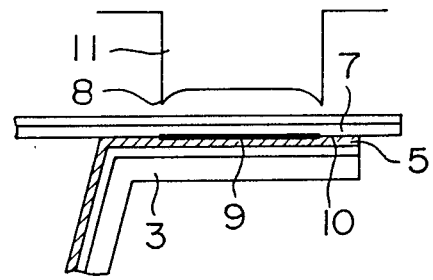
Figure 8:
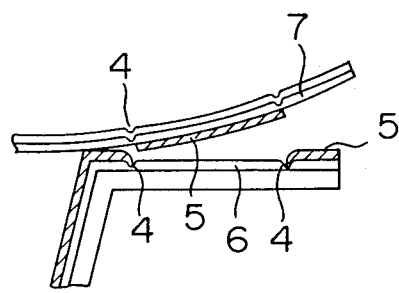
FIG. 8 is a sectional view showing a state where the sealed container obtained by the sealing method of FIG. 7 is being opened.

FIGS. 5 to 7 each show the shape of a sealing plate used in sealing of the container of the present invention having a sealing strength different partly in the sealed area, and a sealing method using the sealing plate. The sealing plate 11 has an inside diameter slightly larger than that of the flange of the container main body, and the flange of the sealing plate 11 has approximately the same shape as the flange of the main body. In order to apply a largest sealing pressure to the innermost portion of the area to be sealed, it is preferred that as shown in FIG. 5, the sealing plate 11 has a V- or U-shaped projection 8 of 0.1–0.5 mm in height at the innermost portion of its flange, or as shown in FIG. 6, the sealing plate 11 has a small inclination at the flange between the outermost and innermost portions so that the innermost portion has a larger height by 0.1–0.5 mm. Alternatively, as shown in FIG. 7 the sealing plate 11 can have two projections 8 and 8 at the innermost and outermost portions of the flange. FIG. 8 shows a state where the sealed container obtained by the sealing method of FIG. 7 is being opened. In this case, peeling of the sealing layer A 5 from the adjacent layer 6 occurs between the two dented portions 4 and 4.

Figure 9:
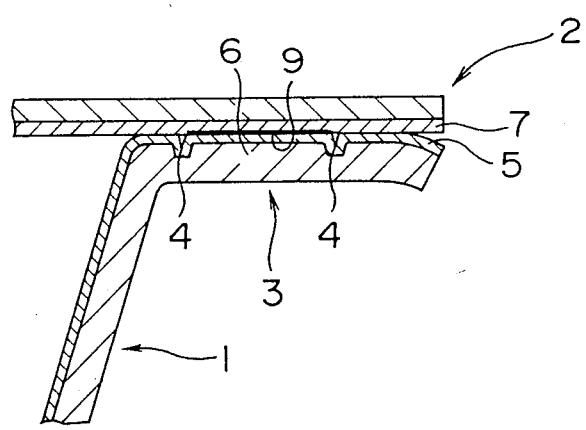
FIGS. 9 and 12 are each an enlarged sectional view showing the flange of another embodiment of the sealed container of the present invention.
Figure 12:
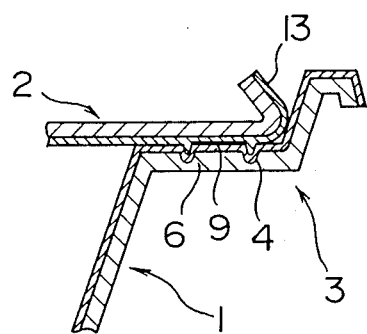

FIGS. 9 and 12 each shows an enlarged sectional view of the flange of another embodiment of the sealed container of the present invention, wherein the flange of the main body has double grooves and the main body and the lid are sealed between the double grooves. That is, the lid 2 is sealed with only the portion of the sealing layer A 5 between the two dented portions 4 and 4 in the flange 3 of the main body 1. The two dented portions 4 and 4 can be formed at the production of the main body.

Figure 10:
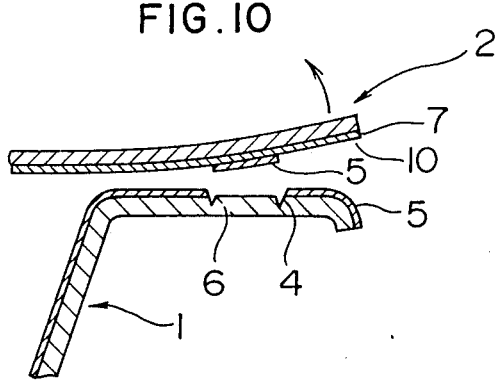
FIG. 10 is a sectional view showing a state where the sealed container of FIG. 9 is being opened.

FIG. 10 is a sectional view showing a state where the sealed container of FIG. 9 is being opened.

Figure 11:
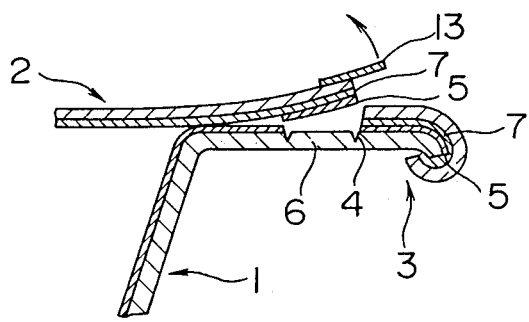
FIG. 11 is a sectional view showing a state where still another embodiment of the sealed container of the present invention is being opened.

In a sealed container as shown in FIG. 11 wherein the main body 1 and the lid 2 are jointly bent in one direction at the end of the flange 3, or in a sealed container as shown in FIG. 12 wherein the end of the flange 3 of the main body 1 is outside the end of the lid 2 and rises higher than the lid 2, the opening of the sealed container can be made effectively by providing a small pull in the lid 2.

In the mechanism of easy opening in the sealed container of the present invention which utilizes the peeling of the sealing layer A 5 of the main body from the adjacent layer 6 at the sealed area of the container, the most important matter is that the sealing layer A 5 can be reliably cut at a predetermined portion of the flange. In order to achieve this, a higher pressure is applied, at the time of sealing, to at least the innermost portion of the area 9 to be sealed than to the rest of the area to be sealed, to form at least one dented portion 4. Therefore, the sealing of the main body and the lid is made at a higher pressure at the portion 4 to be dented than at the rest of the area 9 to be sealed. As a result, the resins of the sealing layers 5 and 7 at the dented portion 4 are softened and pushed to the both sides of the dented portion 4, which makes the sealing layers at the dented portion 4 thin due to the plastic deformation. Consequently, the resins of the sealing layers 5 and 7 at the dented portion 4 commingle with the resin of the adjacent layer 6, and the lamination strength between the sealing layer A 5 and the adjacent layer 6 is made larger at the dented portion than at the rest of the sealed area of the flange. Hence, in the sealed container of the present invention thus produced, the sealing layers at the dented portion are made thin and modified, and as a result, the sealing layer A 5 can be reliably cut at the dented portion 4. For the same reason, the sealing layer A 5 can be cut reliably at two dented portions 4 and 4 also by forming these dented portions at the two ends of the area to be sealed, of the flange of the main body.

When the sealing layer A 5 is not cut well, it occurs sometimes that the non-sealed portion 10 of the sealing layer A 5 sticks to the lid and, in the worst case, even the portion of the sealing layer A 5 inside the container sticks to the lid, making impossible the smooth opening of the container.

EXAMPLE 1

There were prepared, by co-extrusion, two-layer sheets having a total thickness of 850μ and consisting of a sealing layer of a high density polyethylene (density=0.955, melt index=5 g/10 min) and an adjacent layer as an outer layer of a polypropylene (melt index=0.5 g/10 min). Each of the two-layer sheets was subjected to vacuum molding to prepare container main bodies each having an inside diameter of 70 mm, a flange outside diameter of 82 mm and a height of 30 mm. Each of the main bodies had a flange thickness of 800μ, but the thickness of their sealing layers A was changed from 5μ to 100μ.

Each of the above main bodies was heat-sealed with a lid consisting of an outer layer (25μ) of ONy (a biaxially oriented nylon) and a sealing layer (60μ) of a high density polyethylene, using a sealing plate as shown in FIG. 5 having an inside diameter of 73 mm, an outside diameter of 85 mm and a height of projection of 0.15 mm. The heat-sealing conditions were as follows: temperature=180° C., sealing pressure=20 kg/cm², and sealing time=2 sec. The relationship between the thickness of the sealing layer A and the sealing and peeling properties of the sealed container was evaluated. The results are shown in Table 1.

TABLE 1

| Run No. | Thickness of sealing layer A (μ) | Lamination strength (g/25 mm) | Resistance to internal pressure (kg/cm²) | Peelability | Cuttability |
|---|---|---|---|---|---|
| Comp. Ex. 1 | 5 | 800 | 0.15 | Δ | Δ |
| 1A | 10 | 800 | 0.4 | ○ | ○ |
| 1B | 20 | 700 | 0.7 | ○ | ○ |
| 1C | 30 | 700 | 0.8 | ○ | ◎ |
| 1D | 50 | 700 | 1.0 | ○ | ○ |
| Comp. Ex. 2 | 75 | 650 | 1.2 | ○ | Δ |
| Comp. Ex. 3 | 100 | 600 | 1.5 | ◎ | X |

◎: very good
○: Good
Δ: Poor
X: Very poor

EXAMPLE 2

The same main body and the same lid as in the Run No. 1D of Example 1 where heat-sealed under the same conditions by changing the height and position of the projection of the sealing plate used in Example 1. The resulting sealed containers were subjected to the same evaluations as in example 1. The results are shown in Table 2. In Table 2, the column of position of projection, "outer" means that the projection is positioned at a diameter of 80 mm in the sealing plate and "middle" means that the projection is positioned at a diameter of 76 mm in the sealing plate. The sealing plate of "inner" projection position is same as used in Example 1. "0 mm" (height of projection) means a sealing plate having a flat sealing surface.

TABLE 2

| Run No. | Projection height (mm) | Projection position | Lamination strength (g/25 mm) | Resistance to internal pressure (kg/cm²) | Peelability | Cuttability |
|---|---|---|---|---|---|---|
| Comp. Ex. 4 | 0 | — | 700 | 1.8 | ○ | X |
| Comp Ex. 5 | 0.1 | Outer | 700 | 1.8 | ○ | X |
| Comp Ex. 6 | 0.1 | Middle | 700 | 1.6 | ○ | X |
| 2A | 0.1 | Inner | 700 | 1.2 | ○ | ○ |
| Comp. Ex. 7 | 0.15 | Outer | 700 | 1.8 | ○ | X |
| Comp. Ex. 8 | 0.15 | Middle | 700 | 1.5 | ○ | X |
| 2B | 0.15 | Inner | 700 | 0.8 | ○ | ◎ |

EXAMPLE 3

A lid consisting of an outer layer (25μ) of KONy and a sealing layer (100μ) of BS and various container main bodies having flanges consisting of HIPS (50μ) (sealing layer) / an adjacent layer (20μ) / modified PE (20μ) / EVOH (40μ) / modified EVA (20μ) / HIPS (650μ) were heat-sealed under the same conditions as in Example 1 using the same sealing plate as in Example 1. The main bodies were different from one another only in the material of the adjacent layer and the lamination strength. The effect of the lamination strength on the sealing and peeling properties of the sealed container was examined. The results are shown in Table 3.

In the above, HIPS refers to high impact polystyrene; modified PE refers to acid-modified polyethylene; EVOH refers to saponification product of ethylene-vinyl acetate copolymer; modified EVA refers to acid-modified ethylene-vinyl acetate copolymer; KONy refers to biaxially oriented nylon coated with polyvinylidene chloride; and BS refers to butadienestyrene block copolymer.

TABLE 3

| Run No. | Material of adjacent layer | Lamination strength (g/25 mm) | Resistance to internal pressure (kg/cm²) | Peelability | Cuttability |
|---|---|---|---|---|---|
| Comp. Ex. 9 | EVA of VAC = 5% | 150 | 0.2 | ○ | X |
| Comp. Ex. 10 | EVA of VAC = 10% | 250 | 0.3 | ○ | X |

TABLE 3-continued

| Run No. | Material of adjacent layer | Lamination strength (g/25 mm) | Resistance to internal pressure (kg/cm$^2$) | Peela-bility | Cutta-bility |
| --- | --- | --- | --- | --- | --- |
| 3A | EVA of VAC = 20% | 400 | 0.6 | ◯ | ◯ |
| 3B | EVA of VAC = 30% | 700 | 0.8 | ◯ | ◉ |
| 3C | 50/50 mixture of EVA of VAC = 20% and BS | 1500 | 1.0 | ◯ | ◉ |
| Comp. Ex. 11 | BS | 3500 | 1.0 | X | ◉ |

VAC refers to vinyl acetate content.

EXAMPLE 4

There was prepared, by co-extrusion, a two-layer sheet having a total thickness of 850μ and consisting of a sealing layer of a high density polyethylene (density=0.955, melt index=5 g/10 min) and an adjacent layer as an outer layer of a polypropylene (melt index=0.5 g/10 min). This two-layer sheet was subjected to vacuum molding to prepare a container main body having an inside diameter of 70 mm, a flange outside diameter of 82 mm and a height of 30 mm. This main body had a flange of 800μ and the sealing layer 5 had a thickness of 20μ.

This main body was heat-sealed with a lid consisting of an outer layer (25μ) of ONy and a sealing layer (60μ) of HDPE, using three sealing plates having different shapes as shown in FIGS. 5 to 7. For comparison, the same sealing was effected using a conventional sealing plate having a flat sealing surface and accordingly capable of applying the same pressure over the entire sealing surface.

When the sealing was effected using the sealing plate having a projection as in the present invention, the resulting sealed containers could be opened easily and the contents could be taken out easily. On the other hand, when the conventional sealing plate was used for sealing, it happened in some cases that the sealing layer could not be cut and the contents could not be taken out.

As mentioned previously, the conventional method for easy opening has been unable to satisfy both of the two contradictory requirements of no leakage and easy opening. In the sealed container of the present invention, however, peeling of the lid can be satisfactorily effected irrespective of the level of the sealing strength, by conducting sealing and peeling at two different interfaces, as illustrated in Examples 1-4. Accordingly, the present container can be readily opened so as to cause no leakage, thus satisfying both of easy opening and no leakage.

Conventional sealed containers have had to use a lid having a special sealing layer. In the present sealed container, however, no special sealing layer is required, which is advantageous in cost.

Furthermore, in the present sealed container having dented portions at the both ends of the sealed area of the flange, even when the flange is not flat, for example, when the main body flange is curled at the end or bent together with the lid at the end, easy opening is possible by providing a lobe if necessary.

What is claimed:

1. An easily openable sealed container comprising a lid and a main body having at least a sealing layer and an adjacent layer beneath the sealing layer, wherein the main body has a flange and the main body and the lid are sealed at a part of the flange, characterized in that the sealing layer of the main body at the flange has a thickness of 10–70μ, the lamination strength between the sealing layer and the adjacent layer of the main body at the flange is 300–2,000 g/25 mm, and the sealing strength between the lid and the sealing layer of the main body at the flange is larger than the lamination strength between the sealing layer and the adjacent layer of the main body at the flange, and further characterized in that the main body and the lid are sealed with a larger sealing pressure at least at the innermost portion of the sealed area of the flange than at the rest of the sealed area.

2. A sealed container according to claim 1, wherein the innermost portion of the sealed area of the flange has a groove formed by pressing and is dented as compared with the rest of the sealed area of the flange.

3. A sealed container according to claim 1, wherein the innermost portion and the outermost portion of the sealed area of the flange have a groove formed by pressing and are dented as compared with the rest of the sealed area of the flange.

4. An easily openable sealed container comprising a lid and a main body having at least a sealing layer and an adjacent layer beneath the sealing layer, wherein the main body has a flange and the main body and the lid are sealed at a part of the flange, characterized in that the sealing layer of the main body at the flange has a thickness of 10–70μ, the lamination strength between the sealing layer and the adjacent layer of the main body at the flange is 300–2,000 g/25 mm, and the sealing strength between the lid and the sealing layer of the main body at the flange is larger than the lamination strength between the sealing layer and the adjacent layer of the main body at the flange, and further characterized in that the flange of the main body has double grooves and the main body and the lid are sealed between these grooves.

5. A sealed container according to claim 1, wherein the lid consists of a multi-layer film comprising a sealing layer and an outer layer and the sealing layer is made of the same material as that of the sealing layer of the main body.

6. A sealed container according to claim 2, wherein the lid consists of a multi-layer film comprising a sealing layer and an outer layer and the sealing layer is made of the same material as that of the sealing layer of the main body.

7. A sealed container according to claim 3, wherein the lid consists of a multi-layer film comprising a sealing layer and an outer layer and the sealing layer is made of the same material as that of the sealing layer of the main body.

8. A sealed container according to claim 4, wherein the lid consists of a multi-layer film comprising a sealing layer and an outer layer and the sealing layer is made of the same material as that of the sealing layer of the main body.

9. A sealed container according to claim 1, wherein the lid consists of a two-layer film constituted by a sealing layer of a high density polyethylene and an outer layer of a biaxially oriented nylon.

10. A sealed container according to claim 2, wherein the lid consists of a two-layer film constituted by a sealing layer of a high density polyethylene and an outer layer of a biaxially oriented nylon.

11. A sealed container according to claim 3, wherein the lid consists of a two-layer film constituted by a sealing layer of a high density polyethylene and an outer layer of a biaxially oriented nylon.

12. A sealed container according to claim 4, wherein the lid consists of a two-layer film constituted by a sealing layer of a high density polyethylene and an outer layer of a biaxially oriented nylon.

13. A sealed container according to claim 1, wherein the main body consists of a two-layer sheet constituted by a sealing layer of a high density polyethylene and an adjacent layer of a polypropylene beneath the sealing layer.

14. A sealed container according to claim 2, wherein the main body consists of a two-layer sheet constituted by a sealing layer of a high density polyethylene and an adjacent layer of a polypropylene beneath the sealing layer.

15. A sealed container according to claim 3, wherein the main body consists of a two-layer sheet constituted by a sealing layer of a high density polyethylene and an adjacent layer of a polypropylene beneath the sealing layer.

16. A sealed container according to claim 4, wherein the main body consists of a two-layer sheet constituted by a sealing layer of a high density polyethylene and an adjacent layer of a polypropylene beneath the sealing layer.

17. A sealed container according to claim 1, wherein the main body consists of a six-layer sheet constituted by laminating a high density polyethylene as a sealing layer, a polypropylene as an adjacent layer, an acid-modified polypropylene as an adhesive layer, a saponification product of an ethylene-vinyl acetate copolymer or a polyvinylidene chloride as a barrier layer, an acid-modified polypropylene as an adhesive layer and a polypropylene as an outermost layer in this order.

18. A sealed container according to claim 2, wherein the main body consists of a six-layer sheet constituted by laminating a high density polyethylene as a sealing layer, a polypropylene as an adjacent layer, an acid-modified polypropylene as an adhesive layer, a saponification product of an ethylene-vinyl acetate copolymer or a polyvinylidene chloride as a barrier layer, an acid-modified polypropylene as an adhesive layer and a polypropylene as an outermost layer in this order.

19. A sealed container according to claim 3, wherein the main body consists of a six-layer sheet constituted by laminating a high density polyethylene as a sealing layer, a polypropylene as an adjacent layer, an acid-modified polypropylene as an adhesive layer, a saponification product of an ethylene-vinyl acetate copolymer or a polyvinylidene chloride as a barrier layer, an acid-modified polypropylene as an adhesive layer and a polypropylene as an outermost layer in this order.

20. A sealed container according to claim 4, wherein the main body consists of a six-layer sheet constituted by laminating a high density polyethylene as a sealing layer, a polypropylene as an adjacent layer, an acid-modified polypropylene as an adhesive layer, a saponification product of an ethylene-vinyl acetate copolymer or a polyvinylidene chloride as a barrier layer, an acid-modified polypropylene as an adhesive layer and a polypropylene as an outermost layer in this order.

* * * * *